United States Patent
Huang

(10) Patent No.: US 8,724,240 B2
(45) Date of Patent: May 13, 2014

(54) PIEZOELECTRIC ACTUATOR

(75) Inventor: Chien-Wei Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 40 days.

(21) Appl. No.: 13/431,991

(22) Filed: Mar. 28, 2012

(65) Prior Publication Data

US 2013/0163102 A1 Jun. 27, 2013

(30) Foreign Application Priority Data

Dec. 22, 2011 (TW) .............................. 100148155 U

(51) Int. Cl.
*G02B 7/02* (2006.01)
(52) U.S. Cl.
USPC ........................................................ 359/811
(58) Field of Classification Search
CPC ....................................................... G02B 7/02
USPC .......................................................... 359/811
See application file for complete search history.

(56) References Cited

U.S. PATENT DOCUMENTS

2011/0141584 A1* 6/2011 Henderson et al. ........... 359/811

* cited by examiner

*Primary Examiner* — James Jones
(74) *Attorney, Agent, or Firm* — Novak Druce Connolly Bove + Quigg LLP

(57) ABSTRACT

A piezoelectric actuator for driving a lens unit along an optical axis is disclosed. The piezoelectric actuator includes a fixed member, a movable member movably received in the fixed member, a magnetic plate fixed on the fixed member, a magnet fixed on the movable member, a piezoelectric member and a circuit board. The movable member includes a contacting portion. The magnet is aligned with the magnetic plate along a direction substantially perpendicular to the optical axis. The piezoelectric member is fixed on the fixed member and contacts on the contacting portion of the movable member for driving the movable member to move along the optical axis. The circuit board provides voltages to the piezoelectric member.

14 Claims, 3 Drawing Sheets

US 8,724,240 B2

PIEZOELECTRIC ACTUATOR

BACKGROUND

1. Technical Field

The present disclosure relates to actuators, and particularly, relates to a piezoelectric actuator.

2. Description of Related Art

Many camera modules have zooming and/or autofocus functions. A typical camera module employs a piezoelectric actuator to drive a lens unit to move along an optical axis to perform the zoom/focusing functions. The piezoelectric actuator includes a fixed member, a movable member movably received in the fixed member, and a piezoelectric member fixed on the fixed member and contacted with the movable member. The piezoelectric actuator further employs two magnets for providing a preload force on the piezoelectric member and the movable member to drive the piezoelectric member to be in contact with the movable member.

However, in order to receive the magnets, a total length of the camera module increases, which is not beneficial for the pursuit of miniaturization of the camera module. In addition, the movable member is limited to a material that can be inter-attractive with the magnets.

What is needed therefore is a piezoelectric actuator addressing the limitations described.

BRIEF DESCRIPTION OF THE DRAWINGS

The components of the drawings are not necessarily drawn to scale, the emphasis instead being placed upon clearly illustrating the principles of the embodiments of the piezoelectric actuator. Moreover, in the drawings, like reference numerals designate corresponding parts throughout several views.

DETAILED DESCRIPTION

Figure 1:
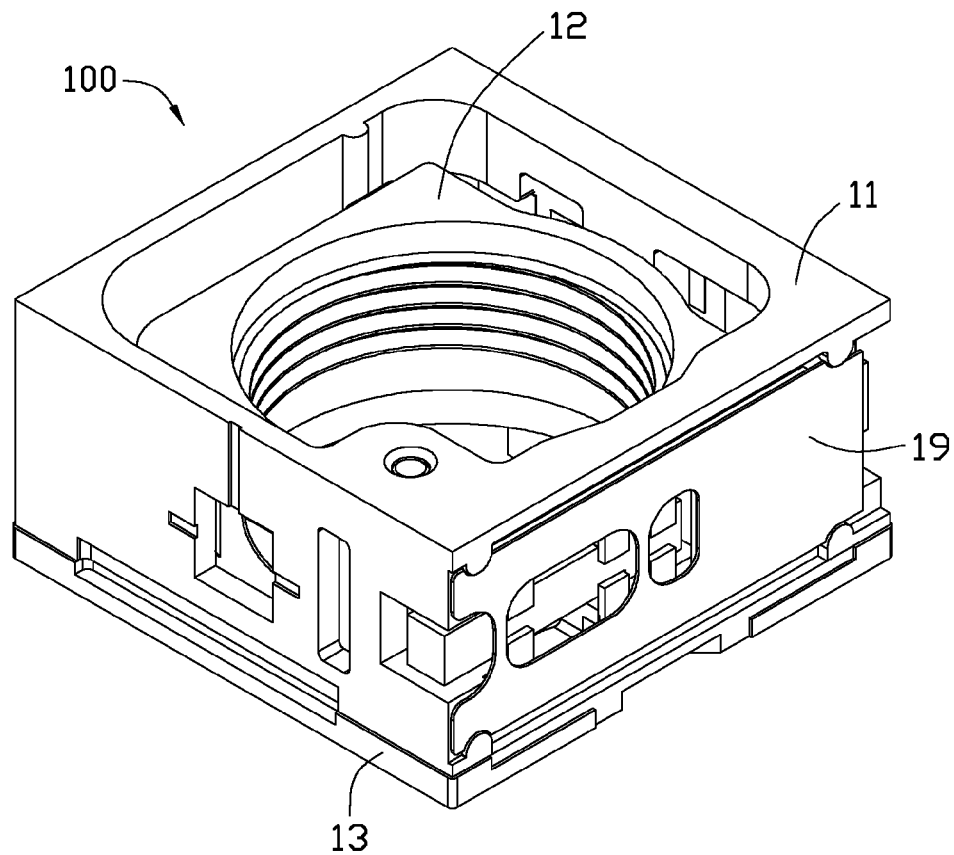
FIG. 1 is an isometric view of a piezoelectric actuator, according to an exemplary embodiment of the present disclosure.
Figure 2:
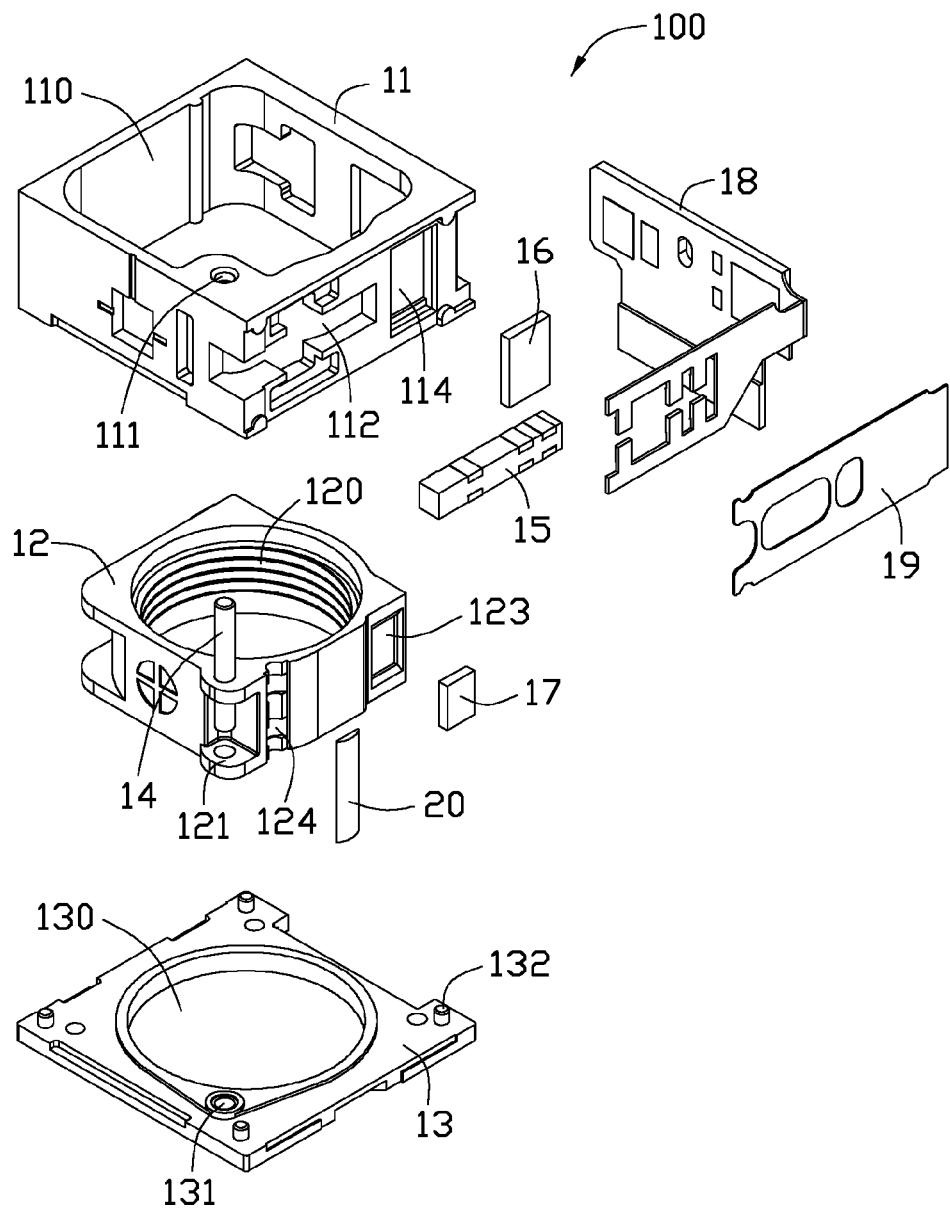
FIG. 2 is an exploded view of the piezoelectric actuator of FIG. 1.
Figure 3:
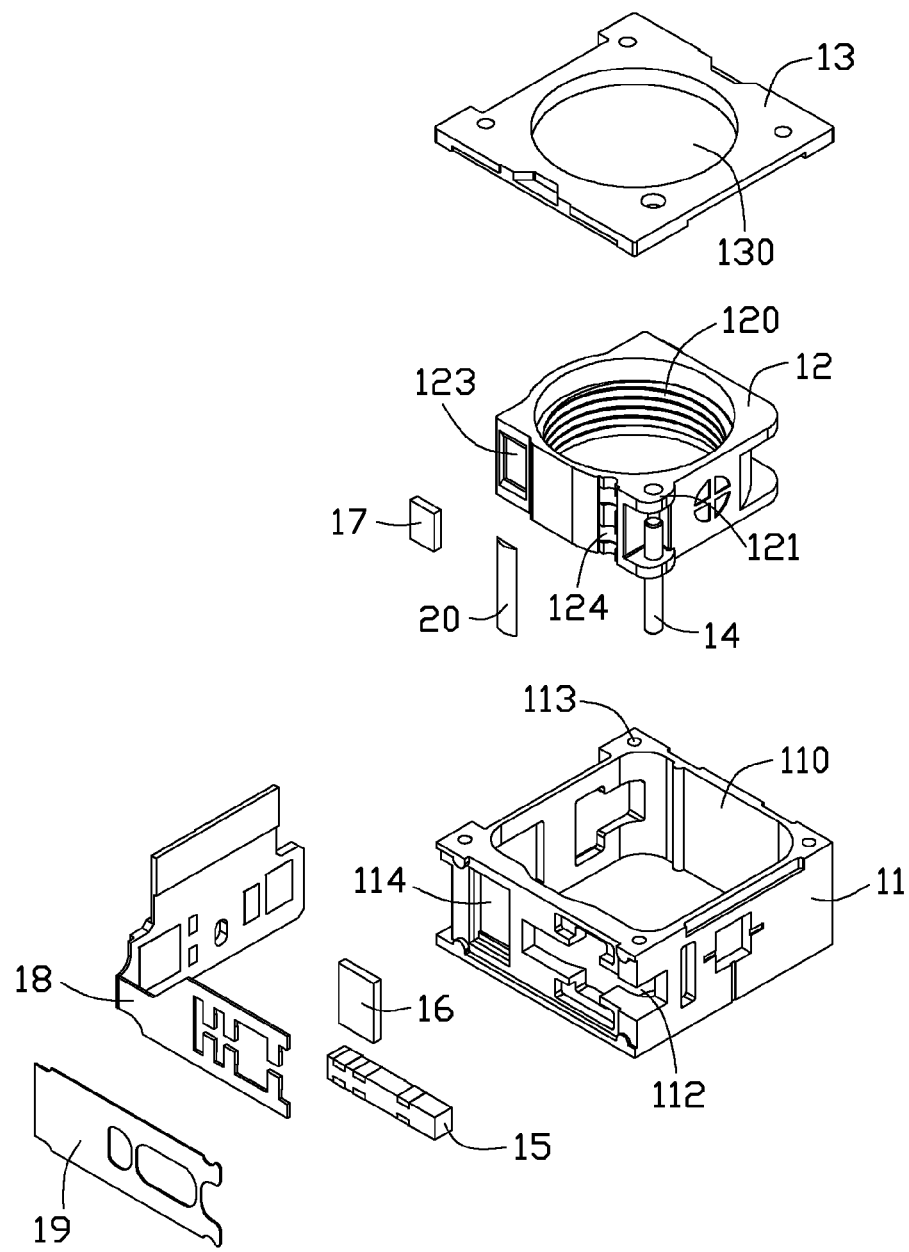
FIG. 3 is similar to FIG. 2, but showing the piezoelectric actuator from another angle.

FIGS. 1-3, show a piezoelectric actuator 100 for driving a lens unit (not shown) to move along an optical axis of the lens unit, according to an exemplary embodiment. The piezoelectric actuator 100 includes a fixed member 11, a movable member 12, a bottom plate 13, a guiding member 14, a piezoelectric member 15, a magnetic plate 16, a magnet 17, and a circuit board 18.

The fixed member 11 is a substantially rectangular frame. The fixed member 11 defines a first receiving space 110 through two opposite ends along the optical axis. The first receiving space 110 movably receives the movable member 12. The fixed member 11 defines a through hole 111 in a corner. A central axis of the through hole 111 is substantially parallel to the optical axis. The fixed member 11 defines a mounting opening 112 and a first groove 114 in an outer sidewall. The mounting opening 112, and the first groove 114 are arranged along a direction substantially perpendicular to the optical axis. The mounting opening 112 receives the piezoelectric member 15, and the first groove 114 receives the magnetic plate 16. The fixed member 11 further includes a number of fixing holes 113 in an end surface facing toward the bottom plate 13. In the embodiment, the number of the fixing holes 113 is four. Each fixing hole 113 is positioned at a corner of the fixed member 11.

The movable member 12 has a substantially rectangular outer contour. The movable member 12 defines a substantially cylindrical second receiving space 120, which extends through two opposite end surfaces, for fixedly receiving the lens unit. The movable member 12 includes a yoke portion 121 formed on a corner, the yoke portion 121 slidably connects the movable member 12 to the guiding member 14. The movable member 12 defines a second groove 123 and a receiving portion 124 in an outer sidewall. The position of the second groove 123 corresponds to that of the first groove 114. The receiving portion 124 is near the yoke portion 121. The movable member 12 includes a contacting portion 20 for contacting with the piezoelectric member 15. In this embodiment, the contacting portion 20 is fixed in the receiving portion 124. Alternatively, the contacting portion 20 may be integrally formed with the movable member 12.

The bottom plate 13 is substantially rectangular. The bottom plate 13 defines a central opening 130. The central opening 130 allows light from the lens unit to pass therethrough and then project on an image sensor (not shown). The bottom plate 13 includes a number of fixing poles 132 corresponding to the fixing holes 113 in the fixed member 11. The bottom plate 13 defines a blind hole 131 corresponding to the first through hole 111.

The guiding member 14 is substantially cylinder-shaped and guides the movable member 12 to move along the optical axis.

The piezoelectric member 15 transforms according to a voltage applied thereon for driving the movable member 12 along the optical axis.

The magnetic plate 16 is made from a material that can be attracted by the magnet 17. The magnetic plate 16 and the magnet 17 apply a preload force on the movable member 12 and the piezoelectric member 15.

The circuit board 18 applies a voltage on the piezoelectric member 15. The circuit board 18 can be a rigid printed circuit board (RPCB) or a flexible circuit board (FPCB).

The piezoelectric actuator 100 further includes a restricting sheet 19 for restricting the piezoelectric member 15 and the magnetic plate 16 on the fixed member 11.

In assembly, the magnet 17 is fixedly received in the second groove 123, and the contacting portion 20 is fixedly received in the receiving portion 124. The movable member 12 is received in the first receiving space 110 of the fixed member 11, the guiding member 14 slidably passes through the yoke portion 121 of the movable member 12, and two opposite ends of the guiding member 14 are respectively fixed in the through hole 111 of the fixed member 11 and the blind hole 131 of the bottom plate 131. The fixing pole 132 respectively inserts into the fixing holes 113 for restricting the movable member 12 in the first receiving space 110. The piezoelectric member 15 is fixedly received in the mounting opening 112, and a portion of the piezoelectric member 15 contacts on the contacting portion 20 of the movable member 12. The magnetic plate 16 is fixedly received in the first groove 114. The magnetic plate 16 is aligned with the magnet 17 along a direction substantially perpendicular to the optical axis. The circuit board 18 is fixed on a sidewall of the fixed member 11 and is electrically connected to the piezoelectric member 15. The restricting member 19 is fixed on a sidewall of the fixed member 11 with the piezoelectric member 15 and the magnetic plate 16, thus the piezoelectric member 15 and the magnetic plate 16 are restricted in the fixed member 11.

In use, the circuit board 18 provides a voltage on the piezoelectric member 15, and the piezoelectric member 15 is made to correspondingly transform under the voltage. During the transformation, the piezoelectric member 15 drives the movable member 12 to move along the optical axis. The magnetic plate 16 and the magnet 17 provide a preload between the fixed member 11 and the piezoelectric member 15, thus the movable member 12 can firmly contact on the piezoelectric member 15. In the assembled piezoelectric actuator 100, the magnetic plate 16 and the piezoelectric member 15 are arranged along a direction substantially perpendicular to the optical axis, therefore, a total length of the piezoelectric along the optical axis is reduced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A piezoelectric actuator for driving a lens unit along an optical axis, comprising:
    a fixed member;
    a substantially rectangular movable member movably received in the fixed member, the movable member comprising a contacting portion positioned on a side surface of the movable member;
    a magnetic plate fixed on the fixed member;
    a magnet fixed on a same side surface of the movable member as the contacting portion and spaced from the contacting portion, the magnet being adjacent to the magnetic plate and aligned with the magnetic plate along a direction substantially perpendicular to the optical axis, the magnet and the magnetic plate providing a preload between the fixed member and the movable member;
    a piezoelectric member fixed on the fixed member and contacting on the contacting portion of the movable member, the piezoelectric be configured for driving the movable member to move along the optical axis; and
    a circuit board configured for providing voltages to the piezoelectric member.

2. The piezoelectric actuator of claim 1, further comprising a bottom plate fixed on the fixed member for restricting the movable member in the fixed member.

3. The piezoelectric actuator of claim 2, wherein the fixed member further comprises a plurality of fixing holes in an end surface thereof facing toward the bottom plate, the bottom plate comprises a plurality of fixing poles spatially corresponding to the fixing holes, each fixed pole inserts into a corresponding fixing hole.

4. The piezoelectric actuator of claim 2, wherein the bottom plate defines a central opening therein for allowing light from the lens unit to pass therethrough.

5. The piezoelectric actuator of claim 2, further comprising a guiding member for guiding the movable member to move along the optical axis, the guiding member slidably passing through the movable member, and two opposite ends of the guiding member being respectively fixed on the fixed member and the bottom plate.

6. The piezoelectric actuator of claim 5, wherein the movable member comprises a yoke portion positioned on a corner thereof, and the guiding member is slidably mounted on the yoke portion.

7. The piezoelectric actuator of claim 1, wherein the fixed member defines a mounting opening in a sidewall thereof, the piezoelectric member is fixedly received in the mounting opening.

8. The piezoelectric actuator of claim 7, wherein the fixed member defines a first groove in the sidewall near the mounting opening, the magnetic plate is fixedly received in the first groove.

9. The piezoelectric actuator of claim 1, wherein the fixed member defines a first receiving space through two opposite ends thereof along the optical axis, the movable member is movably received in the first receiving space.

10. The piezoelectric actuator of claim 1, wherein the movable member defines a second groove in a sidewall thereof, the magnet is fixedly received in the second groove.

11. The piezoelectric actuator of claim 10, wherein the movable member defines a receiving portion in the sidewall, the contacting portion is fixed in the receiving portion.

12. The piezoelectric actuator of claim 1, wherein the contacting portion is integrally formed with the movable member.

13. The piezoelectric actuator of claim 1, further comprising a restricting sheet for restricting the piezoelectric member and the magnetic plate on the fixed member, the restricting member being fixed on a sidewall of the fixed member with the piezoelectric member and the magnetic plate fixed on.

14. The piezoelectric actuator of claim 1, wherein the magnetic plate and the magnet are substantially rectangular-shaped.

* * * * *